US012385571B2

(12) United States Patent
Hu (10) Patent No.: US 12,385,571 B2
(45) Date of Patent: *Aug. 12, 2025

(54) CONTROL VALVE (71) Applicant: HANGZHOU AO KE MEI RUI TECHNOLOGY CO., LTD., Zhejiang (CN)

(72) Inventor: Meiyan Hu, Zhejiang (CN)

(73) Assignee: HANGZHOU AO KE MEI RUI TECHNOLOGY CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/027,357

(22) PCT Filed: Sep. 26, 2021

(86) PCT No.: PCT/CN2021/120577
§ 371 (c)(1),
(2) Date: Mar. 20, 2023

(87) PCT Pub. No.: WO2022/151761
PCT Pub. Date: Jul. 21, 2022

(65) Prior Publication Data
US 2023/0407979 A1 Dec. 21, 2023

(30) Foreign Application Priority Data
Jan. 18, 2021 (CN) .......................... 202110065261.1

(51) Int. Cl.
*F16K 11/08* (2006.01)
*F16K 3/24* (2006.01)
(Continued)

(52) U.S. Cl.
CPC .......... *F16K 11/0856* (2013.01); *F16K 3/243* (2013.01); *F16K 5/0407* (2013.01);
(Continued)

(58) Field of Classification Search
CPC ............... F16K 11/0853; F16K 11/085; F16K 11/0856; F16K 3/246; F16K 3/243;
(Continued)

(56) References Cited

U.S. PATENT DOCUMENTS 3,108,779 A * 10/1963 Anderson ............... F16K 25/00
251/315.11
3,276,739 A * 10/1966 Freed ..................... F16K 5/0264
251/368
(Continued)

FOREIGN PATENT DOCUMENTS

CN 103742675 A 4/2014
CN 104806779 A 7/2015
(Continued)

OTHER PUBLICATIONS

International Search Report for PCT/CN2021/120577 mailed Dec. 3, 2021, ISA/CN.
(Continued)

*Primary Examiner* — Craig J Price
(74) *Attorney, Agent, or Firm* — Yue (Robert) Xu; Apex Attorneys at Law, LLP (57) ABSTRACT

Disclosed is a control valve. The control valve comprises a sealing member, and the sealing member comprises an elastic pad and a sealing piece which have an integral structure. The control valve is provided with a rotation suppression portion, the rotation suppression portion is integrally formed with or fixedly connected to or in position-limiting connection with the inner surface of a valve body member, and the rotation suppression portion works in conjunction with the sealing member, so as to prevent the elastic pad from rotating with respect to a side wall portion and prevent movement of the sealing member with respect to the side wall portion.

19 Claims, 6 Drawing Sheets (51) Int. Cl.
  *F16K 5/04* (2006.01)
  *F16K 11/076* (2006.01)
  *F16K 11/085* (2006.01)
  *F16K 27/04* (2006.01)
  *F16K 27/06* (2006.01)
(52) U.S. Cl.
  CPC .......... *F16K 5/0471* (2013.01); *F16K 11/076* (2013.01); *F16K 11/085* (2013.01); *F16K 11/0853* (2013.01); *F16K 27/041* (2013.01); *F16K 27/065* (2013.01)
(58) Field of Classification Search
  CPC .... F16K 5/0471; F16K 5/0407; F16K 27/041; F16K 27/065; F16K 27/027; F16K 27/06
  USPC .... 137/375, 625.47, 625.46, 625.41, 625.31, 137/625.32, 625.21–625.24, 625.15, 137/625.16, 625.19; 251/180–185, 188, 251/192, 207–209, 283, 286–288, 251/304–317.1, 345, 352
  See application file for complete search history.

(56) References Cited

U.S. PATENT DOCUMENTS

| | | | |
|---|---|---|---|
| 3,658,093 A | 4/1972 | Kirkwood | |
| 3,916,950 A * | 11/1975 | Mongerson | F16K 11/085 251/361 |
| 4,478,388 A * | 10/1984 | George | F16K 5/0271 251/309 |
| 4,569,371 A * | 2/1986 | Dolejs | F16K 11/076 251/174 |
| 9,103,448 B2 * | 8/2015 | Witkowski | B23P 15/001 |
| 10,337,626 B2 * | 7/2019 | Takamatsu | F16K 11/076 |
| 11,530,591 B2 * | 12/2022 | Witkowski | F16K 31/126 |
| 11,644,112 B2 * | 5/2023 | Gray | F16K 5/0264 251/309 |
| 12,078,254 B2 * | 9/2024 | Hu | F16K 27/065 |
| 12,169,025 B2 * | 12/2024 | Hu | F16K 5/0407 |
| 2018/0292016 A1 | 10/2018 | Ledvora et al. | |
| 2024/0191805 A1 * | 6/2024 | Wang | F16K 11/085 |
| 2024/0200672 A1 * | 6/2024 | Wang | F16K 3/243 |

FOREIGN PATENT DOCUMENTS

| | | |
|---|---|---|
| CN | 204647386 U | 9/2015 |
| CN | 206175729 U | 5/2017 |
| CN | 107830207 A | 3/2018 |
| CN | 111828687 A | 10/2020 |
| CN | 111981164 A | 11/2020 |
| EP | 3385583 A1 | 10/2018 |
| EP | 4325104 A1 | 2/2024 |
| JP | 3049769 U | 6/1998 |
| JP | 2001-343077 A | 12/2001 |

OTHER PUBLICATIONS

First Office Action dated Mar. 5, 2024 for Japanese patent application No. 2023-543151, English translation provided by Global Dossier.
European Search Report issued on Dec. 16, 2024 for the European counterpart application No. 21918952.9.
Korean First Office Action issued on Feb. 24, 2025 for the Korean counterpart application No. 10-2023-7009191.

* cited by examiner

CONTROL VALVE

This disclosure is a national phase application of PCT international patent application PCT/CN2021/120577, filed on Sep. 26, 2021 which claims the priority to Chinese Patent Application No. 202110065261.1, titled "VALVE DEVICE", filed with the China National Intellectual Property Administration on Jan. 18, 2021, the entire disclosure of which are incorporated herein by reference.

FIELD

The present disclosure relates to the technical field of fluid control, and in particular to a control valve.

BACKGROUND

Some systems need to use a multi-passage control valve to control a flow path. For example, a motor vehicle may generally have multiple control valves in order to conduct controlling at present. In a multi-passage control valve, a sealing member and an elastic pad with separate structures are used for realizing sealing and sliding-fit with a valve core.

SUMMARY

In order to provide a control valve, the following technical solution is provided according to the present disclosure:

a control valve includes a valve body component and a valve core component, the control valve has a valve chamber, at least most of the valve core component is located in the valve chamber, the valve core component is driven to be rotatable; the valve body component includes a side wall portion, the side wall portion is a peripheral wall or at least a part of the peripheral wall of the valve chamber, the valve body component is provided with a communication hole, the control valve further includes a sealing component, the sealing component is located between the side wall portion and the valve core component, the sealing component includes an elastic pad and a sealing member, the elastic pad and the sealing member are fixed to form an integral structure, the elastic pad is located between the sealing member and the side wall portion of the valve body component, the sealing member is in contact with the valve core component, a surface of the sealing member in contact with the valve core component is smoother than a surface of the elastic pad in contact with the side wall portion, the control valve has a rotation suppression portion, the rotation suppression portion is integrally formed with or fixedly connected to or in position-limiting connection with an inner surface of the valve body component, and the rotation suppression portion is fitted with the sealing component to limit the sealing component from rotating clockwise or counterclockwise relative to the valve body component.

In this case, the sealing member of the control valve includes the elastic pad and the sealing member which have the integral structure, the surface of the sealing member in contact with the valve core component is smoother than the surface of the elastic pad in contact with the side wall portion, the control valve is provided with the rotation suppression portion, the rotation suppression portion is integrally formed with or fixedly connected to or in position-limiting connection with the inner surface of the valve body component, and the rotation suppression portion is fitted with the sealing member, so as to limit the sealing component from rotating clockwise or counterclockwise relative to the valve body component, limit the elastic pad from rotating relative to the side wall portion, and prevent the sealing component from moving relative to the side wall portion, which has a simple structure and facilitates of assembling.

DETAILED DESCRIPTION OF THE EMBODIMENTS

The technical solution is described below in conjunction with specific embodiments. As shown in FIG. 1 to FIG. 5, a control valve 200 includes a valve body component 10, a valve core component 20, a driving box 30, and a sealing component 40. The control valve has a valve chamber 102, the valve core component 20 is rotatable driven by a driving member in the driving box, for example, the driving member may be a motor or a motor and a reduction gear set. The valve body component 10 includes a side wall portion 12 and a cover 50, and the side wall portion 12 is fixedly connected to the cover 50. The side wall portion 12 is a peripheral wall or at least a part of the peripheral wall of the valve chamber, the valve body component 10 has a communication hole 101, and multiple communication holes 101 may be provided. For example, in this embodiment, five communication holes 101 are provided, alternatively, greater than or less than five communication holes 101 can be provided. The sealing component 40 is located between the side wall portion 12 and the valve core component 20; the sealing component 40 includes an elastic pad 41 and a sealing member 42, the elastic pad 41 is fixedly connected to the sealing member 42, the elastic pad 41 is located between the sealing member 42 and the side wall portion 12 of the valve body component 10, the sealing member 42 is in contact with the valve core component 20, a surface of the sealing member in contact with the valve core component is smoother than a surface of the elastic pad in contact with the side wall portion, the control valve has a rotation suppression portion, the rotation suppression portion is integrally formed with or fixedly connected to or in position-limiting connection with an inner surface of the valve body component, and the rotation suppression portion is fitted with the sealing component to limit the sealing component from rotating clockwise or counterclockwise relative to the valve body component. The acting force between the sealing member 42 and the valve core component 20 includes sliding friction force, and the acting force between the elastic pad 41 and the side wall portion 12 is static friction force. The rotation suppression portion can limit the sealing component 40 from rotating relative to the side wall portion 12. The elastic pad 41 and the sealing member 42 may be fixed together by adhesion. The sealing member 42 may be made of Teflon, and the sealing member 42 can be not only used for sealing, but also has a certain lubricating performance, which can reduce the friction between the valve core component and the sealing component, thereby reducing the driving force of the control valve.

Figure 1:
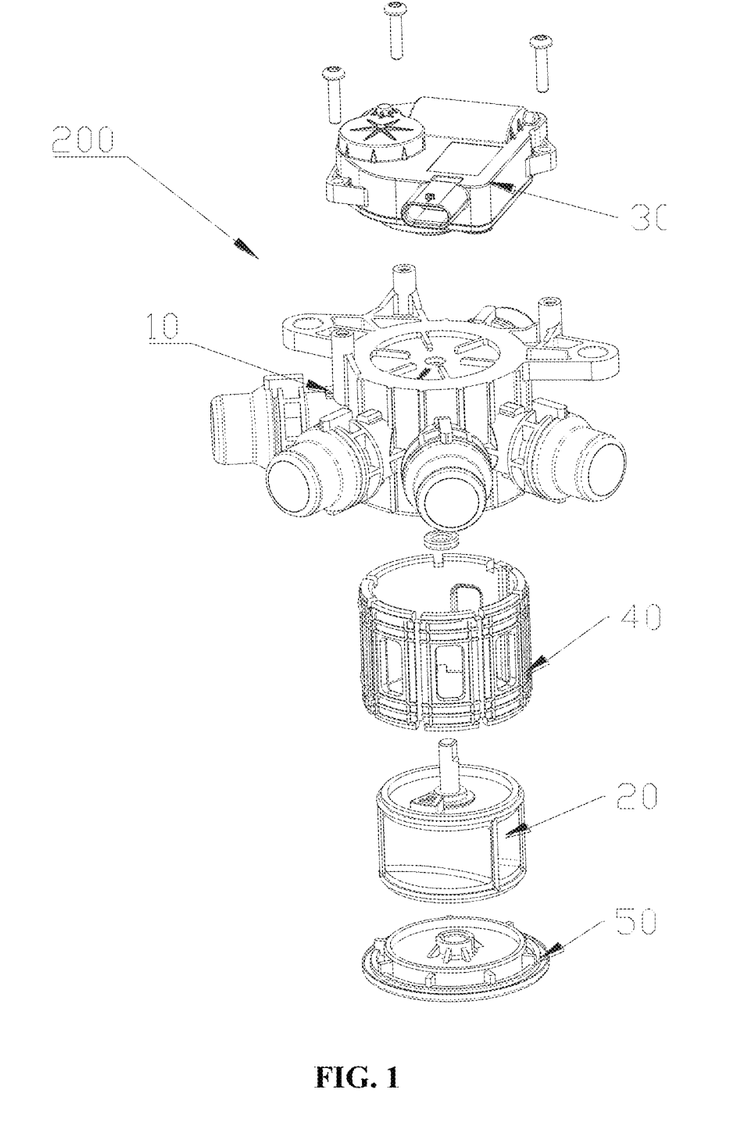
FIG. 1 is a schematic exploded view of a control valve according to the present disclosure.
Figure 2:
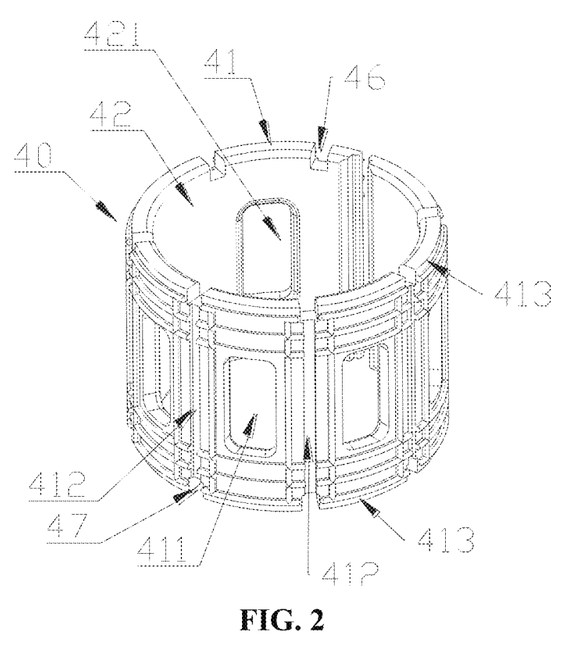
FIG. 2 is a schematic perspective view of a sealing component according to a first embodiment of the present disclosure.

As shown in FIG. 2, the elastic pad 41 has a first through holes 411, a first recessed groove 412 and a second recessed groove 413, the first through holes 411 are in communication with the communication holes 101, openings of the first recessed grooves 412 and the second recessed grooves 413 are configured toward the side wall portion 12. The first recessed groove 412 may extend from one end of the elastic pad 41 to the other end of the elastic pad 41 in a longitudinal direction of the elastic pad 41, and multiple first recessed grooves 412 are provided. In this embodiment, the first recessed grooves 412 are distributed on two sides of the first through hole 411, and the first recessed groove 412 located between two adjacent first through holes 411 may be located in the middle of a portion located between the two adjacent first through holes 411. The first recessed grooves 412 may be arranged axially, the second recessed grooves 413 may be arranged circumferentially or in other form, and an expansion space for the elastic pad 41 may be formed by the second recessed grooves 413 when the elastic pad 41 is compressed under force. In this embodiment, the second recessed grooves 413 are located on at least one side of the elastic pad 41 in the longitudinal direction of the elastic pad 41, and the first recessed grooves 412 are in communication with the second recessed grooves 413.

Figure 3:
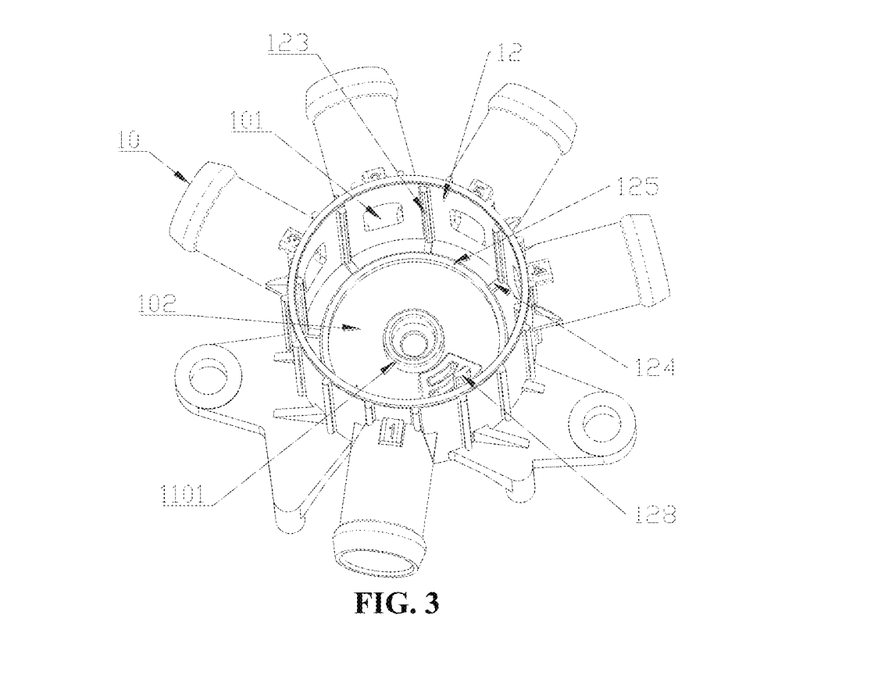
FIG. 3 is a schematic perspective view of a valve body component according to the first embodiment of the present disclosure.

As shown in FIG. 3, the valve body component 10 includes protruding ribs 123 which protrude from the side wall portion 12. In this embodiment, the protruding ribs 123 protrude from the side wall portion 12.

The number of the protruding ribs 123 corresponds to the number of the first recessed grooves 412, each protruding rib 123 is inserted into the corresponding first recessed groove 412, and the protruding rib 123 is in interference fit with the corresponding first recessed groove 412. The arrangement of the protruding ribs 123 and the first recessed grooves 412 can realize the positioning and mounting of the sealing component 40, so that the positions of the first through holes 411 correspond to those of the communication holes 101 to communicate the fluid. In addition, the fitting manner between the protruding ribs 123 and the first recessed grooves 412 can limit a position of the sealing component 40, and prevent the sealing component 40 from moving when the valve core component rotates. In this embodiment, the rotation suppression portion includes the protruding ribs 123 and the first recessed grooves 412. In this embodiment, a height of the protruding ribs 123 protruding from the side wall portion 12 is less than a depth of the first recessed grooves 412, so that a certain gap is formed between the protruding rib 123 and a bottom of the first recessed groove 412. In this way, the elastic pad 41 abuts against the side wall portion 12, and an expansion space for the elastic deformation generated by the elastic pad can be reserved by the gaps formed between the protruding ribs 123 and the bottom of the first recessed grooves 412.

Figure 4:
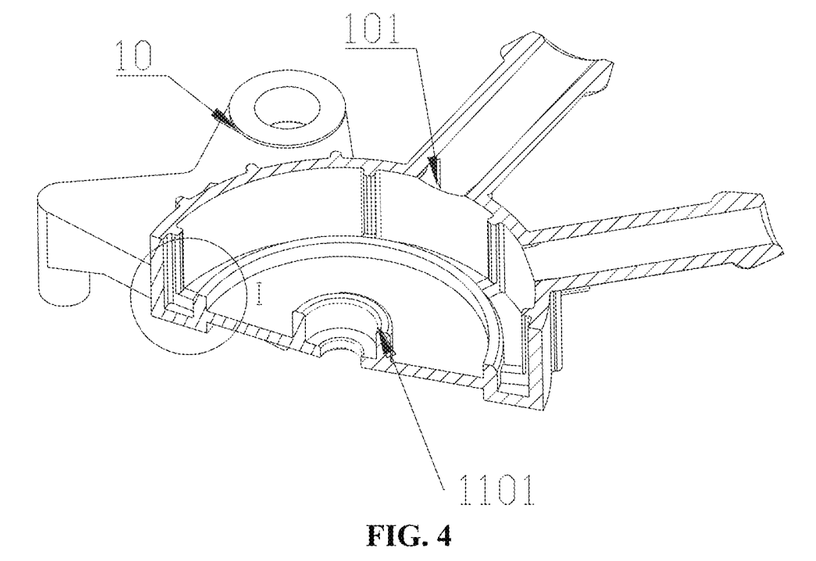
FIG. 4 is a schematic partially cross-sectional view of the valve body component in FIG. 3.
Figure 5:
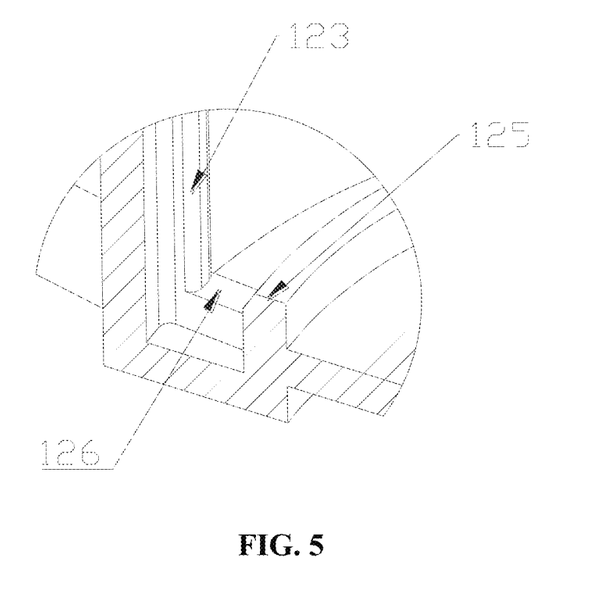
FIG. 5 is a schematic partially enlarged view of the portion I in FIG. 4.

As shown in FIG. 3 to FIG. 5, the valve body component 10 further includes a bottom wall 11 and boss portions 124, the bottom wall 11 is integrally formed with the side wall portion 12, and the boss portions 124 protrude from the bottom wall 11. Each boss portion 124 includes a blocking portion 125 and a first supporting portion 126, the blocking portion 125 protrudes from the first supporting portion 126 by a set distance, at least part of the first supporting portion 126 is located between the protruding rib 123 and the blocking portion 125, and a position-limiting space 127 is formed between the blocking portion 125 and the protruding rib 123. After the sealing component 40 is mounted in the valve body component 10, one end of the sealing component 40 is accommodated in the position-limiting space 127. The sealing component 40 has first notch portions 46, the first notch portions 46 are located in an end surface of the sealing component and extend toward an interior of the sealing component 40, and the first supporting portion 126 is inserted into the corresponding first notch portion 46 and abuts against the sealing component 40. The arrangement of the boss portions 124 can limit a position of the end of the sealing component 40, and prevent the end of the sealing component 40 from being separated from the valve body component 10. The rotation suppression portion can further include that the first supporting portion 126 is inserted into the corresponding first notch portion 46 and abuts against the sealing component 40.

Figure 6:
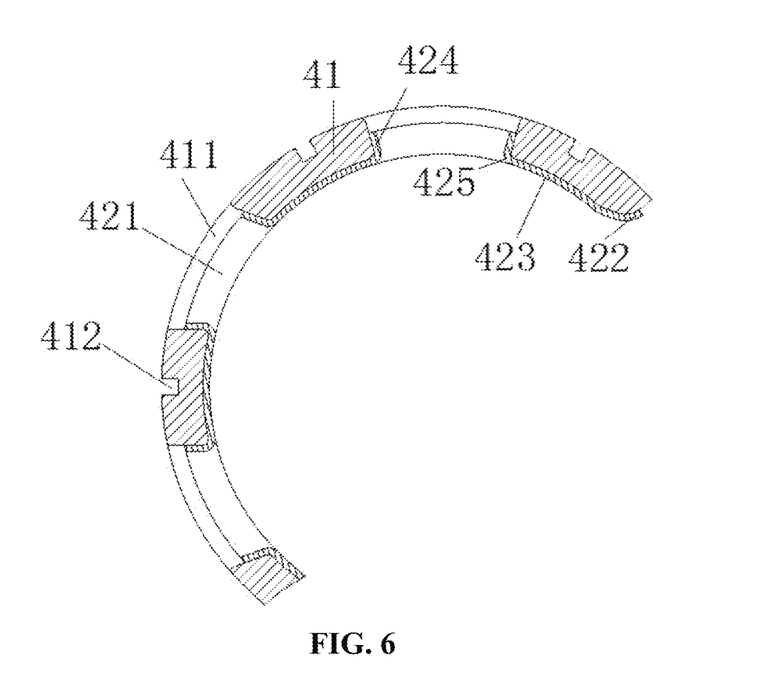
FIG. 6 is a schematic partially cross-sectional view of the sealing component in FIG. 2.

As shown in FIG. 2 and FIG. 6, the sealing member 42 includes position-limiting portions 422, a fitting portion 423, a hemming portion 424 and a connecting portion 425, the fitting portion 423 is in sliding fit with the valve core component 20, the two position-limiting portions 422 are located on two sides of the sealing member 42 in a circumferential direction of the sealing member 42, and each position-limiting portion 422 has an outward protruding structure or a bending structure, which can further limit the position of the two sides of the elastic pad 41, so as to limit the deformation range of the elastic pad 41 after extrusion. In this embodiment, since the position-limiting fit manner between the protruding ribs 123 and the first recessed grooves 412 is provided, the position-limiting portions 422 are located on two sides of the elastic pad 41, and a height of the position-limiting portions is less than a thickness of the two sides of the elastic pad, so that the expansion space for the elastic pad 41 can be formed. As shown in FIG. 3, the valve body component 10 has a stop portion 128, the stop portion 128 protrudes from the side wall portion 12 and is inserted into the valve chamber 102, and the position-limiting portions 422 are in contact with a side surface of the stop portion 128. The position-limiting portions 422 are in contact with two circumferential side surfaces of the stop portion 128 within the elastic range of the sealing component, which can limit the sealing component from rotating relative to the valve body component. The rotation suppression portion can further include that the position-limiting portions 422 are in contact with two circumferential side surfaces of the stop portion 128.

A second through hole 421 is formed in the hemming portion 424, and at least a part of the hemming portion 424 is inserted into the first through hole 411 and is fixed to an inner wall of the first through hole 411 by adhesion, so that the first through hole 411 is in communication with the second through hole 421. A height of the hemming portion 424 is less than a length of the first through hole 411, so that the sealing member 42 can be prevented from contacting a second side wall portion 122 when the elastic pad 41 is compressed, thus the elastic pad 41 can have greater compression space.

In this embodiment, on one hand, the arrangement of the hemming portion 424 increases a contact area between the elastic pad 41 and the sealing member 42 and improves the adhesive force between the elastic pad 41 and the sealing member 42, on the other hand, the hemming portion 424 is inserted into the first through hole 411 so as to limit the position of the sealing member 42 and the elastic pad 41, and prevent the seal 42 and the elastic gasket 41 from being misplaced when the valve core component rotates.

The connecting portion 425 is located between the hemming portion 424 and the fitting portion 423, and the hemming portion 424 is rounding connected to the fitting portion 423 by the connecting portion 425. In this embodiment, a diameter of a connection position of the connecting portion 425 with the fitting portion 423 gradually increases in a direction toward the valve core component, and the connecting portion 425 can be used for buffering and guiding during the rotation of the valve core component.

Referring to FIG. 1, FIG. 3, FIG. 4, FIG. 8 and FIG. 9, the valve body component 10 is provided with a first valve core supporting portion 1101 and a second valve core supporting portion 1102, the first valve core supporting portion 1101 protrudes from the bottom wall, the second valve core supporting portion 1102 protrudes from an end surface of the cover 50, a part of the valve core component 20 is inserted into the first valve core supporting portion 1101, another part of the valve core component 20 is inserted into the second valve core supporting portion 1102, and the valve core component 20 is rotatably supported on the first valve core supporting portion 1101 and the second valve core supporting portion 1102; the first valve core supporting portion 1101 and the second valve core supporting portion 1102 both include a notch portion and a rib plate portion. Taking the second valve core supporting portion 1102 as an example, the second valve core supporting portion 1102 includes notch portions 112 and a rib plate portions 113, the impurities in the coolant entering the fitting portion 111 can be discharged in time by the arrangement of the notch portions 112 so as to prevent the valve core component from being stuck. The arrangement of the rib plate portions 113 can improve the strength of the second valve core supporting portion 1102 and reduce the influence of the notch portions 112 on the strength of the second valve core supporting portion 1102. In addition, a height of the second valve core supporting portion 1102 is greater than or equal to a height of the boss portion 124, which can reduce the friction of the valve core component. In addition, the boss portions 124 can prevent the sealing component 40 from being separated from the valve body component 10 when it is compressed and deformed.

Figure 9:
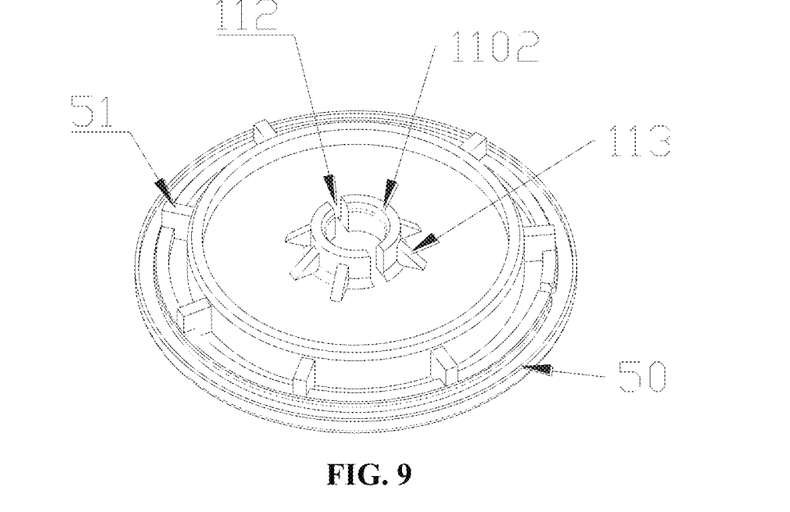
FIG. 9 is a schematic perspective view of a cover of the control valve according to the present disclosure.
Figure 10:
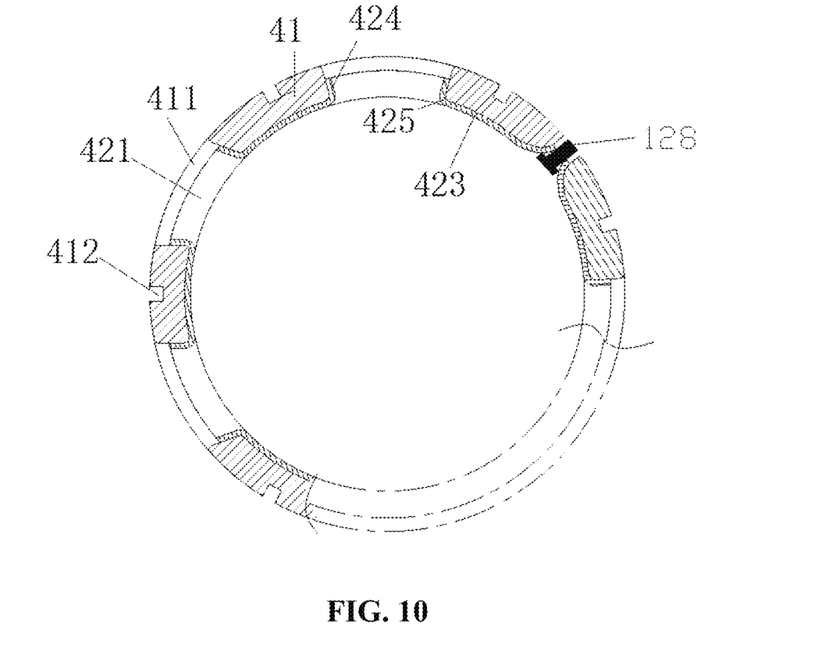
FIG. 10 is a schematic cross-sectional view showing how the position-limiting portions are in contact with two circumferential side surfaces of the stop portion within the elastic range of the sealing component" in FIG. 6.

The cover 50 further includes a second supporting portions 51, an end surface of the sealing component 40 is provided with the first notch portions 46, another end surface of the sealing component 40 is provided with second notch portions 47, the first supporting portion 126 is inserted into the corresponding first notch portion 46 and abuts against the sealing component 40, the second supporting portion 51 is inserted into the corresponding second notch portion 47 and abuts against the sealing component 40, so as to further limit the position of the sealing component 40.

Figure 7:
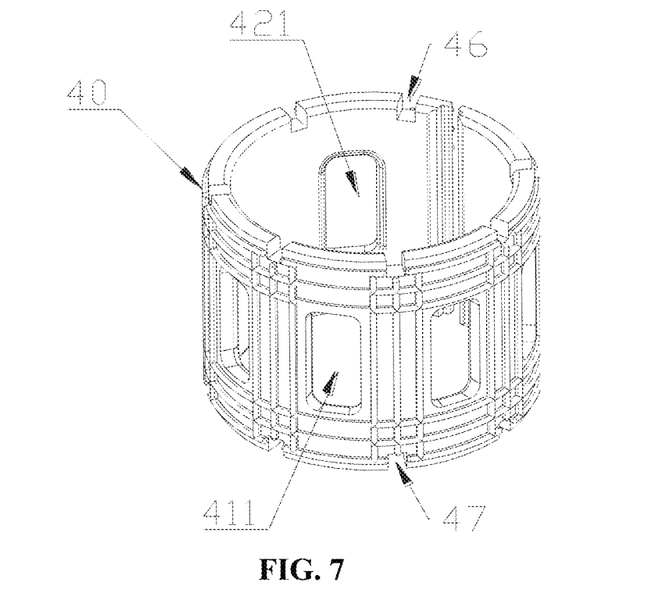
FIG. 7 is a schematic perspective view of the sealing component according to a second embodiment of the present disclosure.
Figure 8:
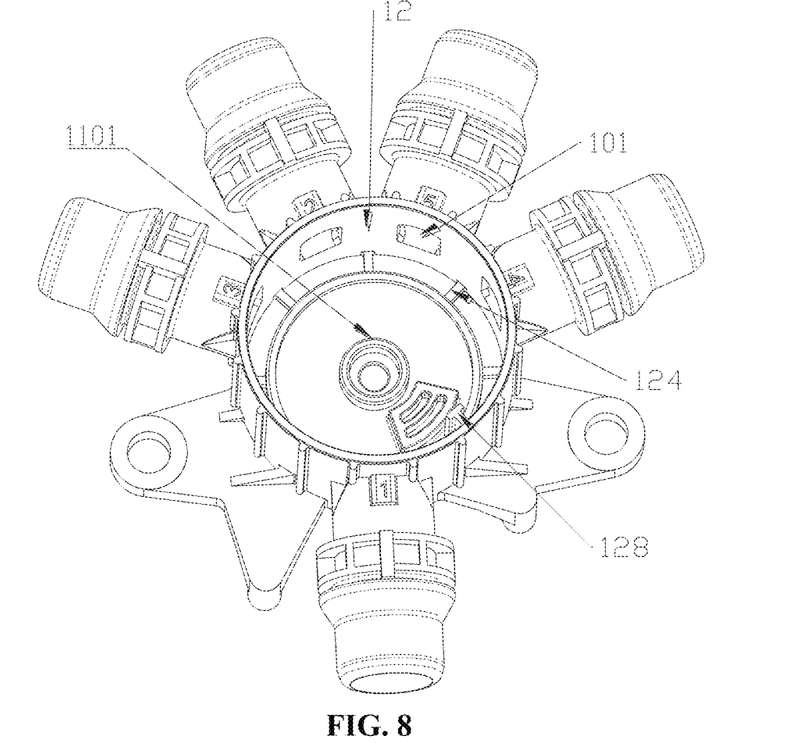
FIG. 8 is a schematic perspective view of the valve body component according to the second embodiment of the present disclosure.

FIG. 7 is a schematic perspective view of the sealing component according to a second embodiment of the present disclosure; compared with the first embodiment, the main difference is that: the sealing component 40 is not provided with the first recessed grooves 412. FIG. 8 is a schematic perspective view of the valve body component according to the second embodiment of the present disclosure; compared with the first embodiment, the main difference is that: the protruding ribs 123 are not provided. Referring to FIG. 7 and FIG. 8, the sealing component 40 is arranged in an inner chamber of the valve body component, the position-limiting portions 422 of the sealing component are in contact with the side surface of the stop portion 128; the position-limiting portions 422 of the sealing component are in contact with the side surface of the stop portion 128 within the elastic range of the sealing component, which can limit the sealing component from rotating relative to the valve body component, thereby simplifying the structure and reducing the difficulty of assembly compared with the first embodiment. Other similar arrangements are not repeated.

In addition, in some embodiments, the first notch portions 46 and the second notch portions 47 may not be provided, and the first supporting portions 126 and the second supporting portions 51 are not provided accordingly, which can further simplify the structure and reduce the difficulty of assembly.

It should be noted that although the present application has been described herein in detail with reference to the above embodiments, those of ordinary skill in the art should understand that those skilled in the art may still modify or equivalently replace the present application, and all technical solutions and its improvements that do not apart from the spirit and scope of the present application should be covered by the scope of the claims of the present application.

The invention claimed is:

1. A control valve, comprising a valve body component and a valve core component, wherein the control valve has a valve chamber, at least most of the valve core component is located in the valve chamber, the valve core component is driven to be rotatable; the valve body component comprises a side wall portion, the side wall portion is a peripheral wall or at least a part of the peripheral wall of the valve chamber, the valve body component is provided with a communication hole, wherein the control valve further comprises a sealing component, the sealing component is located between the side wall portion and the valve core component, the sealing component comprises an elastic pad and a sealing member, the elastic pad and the sealing member are fixed to form an integral structure, the elastic pad is located between the sealing member and the side wall portion of the valve body component, the sealing member is in contact with the valve core component, a surface of the sealing member in contact with the valve core component is smoother than a surface of the elastic pad in contact with the side wall portion, the control valve has a rotation suppression portion, the rotation suppression portion is integrally formed with or fixedly connected to or in position-limiting connection with an inner surface of the valve body component, and the rotation suppression portion is fitted with the sealing component to limit the sealing component from rotating clockwise or counterclockwise relative to the valve body component, wherein the sealing member is fixedly connected to the elastic pad, the sealing member comprises a hemming portion and a fitting portion, the fitting portion is arranged toward the valve core component and is in sliding fit with the valve core component, the elastic pad has a first through hole, the first through hole is in communication with the communication hole, the sealing member further has a second through hole, the second through hole is in communication with the communication hole through the first through hole, the second through hole is formed in the hemming portion, at least a part of the hemming portion is inserted into the first through hole and is fixed to an inner wall of the first through hole by adhesion, and a height of the hemming portion is less than a length of the first through hole.

2. The control valve according to claim 1, wherein the sealing member comprises at least two position-limiting portions located on two sides of the sealing member, each position-limiting portion has an outward protruding structure or a bending structure, the position-limiting portions are located on two sides of the elastic pad, and a height of the position-limiting portions is less than a thickness of the two sides of the elastic pad; the valve body component has a stop portion, the stop portion is arranged to protrude from the side wall portion and is inserted into the valve chamber, and the position-limiting portions are in contact with two circumferential side surfaces of the stop portion, respectively.

3. The control valve according to claim 2, wherein the sealing member further comprises a connecting portion, the connecting portion is located between the hemming portion and the fitting portion, the hemming portion has a rounded connection to the fitting portion by the connecting portion, and a diameter of a connection position of the connecting portion with the fitting portion gradually increases in a direction toward the valve core component.

4. The control valve according to claim 1, wherein the elastic pad has a first recessed groove which extends axially, the valve body component has a protruding rib that protrudes from the side wall portion, the protruding rib is inserted into the first recessed groove, and a height of the protruding rib protruding from the side wall portion is less than a depth of the first recessed groove.

5. The control valve according to claim 4, wherein the elastic pad has a first through hole, the first recessed groove extends from one end of the elastic pad to the other end of the elastic pad in a longitudinal direction of the elastic pad, wherein a plurality of first recessed grooves are provided, the first recessed grooves are distributed on two sides of the first through hole, and the protruding rib is in interference fit with the corresponding first recessed groove.

6. The control valve according to claim 5, wherein the valve body component further comprises a bottom wall and a boss portion, the bottom wall is integrally formed with the side wall portion, the boss portion protrudes from the bottom wall and extends toward the valve chamber, the boss portion comprises a blocking portion and a first supporting portion, the blocking portion protrudes from the first supporting portion by a set distance, wherein the first supporting portion is located between the protruding rib and the blocking portion, the protruding rib is connected to the first supporting portion, a position-limiting space is formed between the blocking portion and the protruding rib, one end of the sealing component is located in the position-limiting space, and the sealing component abuts against the first supporting portion.

7. The control valve according to claim 5, wherein the valve body component further comprises a bottom wall and a cover, the cover is fixedly connected to the side wall portion, the valve body component further comprises a first valve core supporting portion which protrudes from the bottom wall, the cover comprise a second valve core supporting portion which protrudes from an end surface of the cover, a part of the valve core component is inserted into the first valve core supporting portion, another part of the valve core component is inserted into the second valve core supporting portion, and the valve core component is rotatably supported on the first valve core supporting portion and the second valve core supporting portion.

8. The control valve according to claim 1, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

9. The control valve according to claim 8, wherein the elastic pad has a first recessed groove and a second recessed groove, the first recessed groove extends axially, the second recessed groove is arranged circumferentially, the second recessed groove is located on at least one side of the elastic pad, and the first recessed groove is in communication with the second recessed groove.

10. The control valve according to claim 1, wherein the elastic pad has a first recessed groove which extends axially, the valve body component has a protruding rib that protrudes from the side wall portion, the protruding rib is inserted into the first recessed groove, and a height of the protruding rib protruding from the side wall portion is less than a depth of the first recessed groove.

11. The control valve according to claim 2, wherein the elastic pad has a first recessed groove which extends axially, the valve body component has a protruding rib that protrudes from the side wall portion, the protruding rib is inserted into the first recessed groove, and a height of the protruding rib protruding from the side wall portion is less than a depth of the first recessed groove.

12. The control valve according to claim 3, wherein the elastic pad has a first recessed groove which extends axially, the valve body component has a protruding rib that protrudes from the side wall portion, the protruding rib is inserted into the first recessed groove, and a height of the protruding rib protruding from the side wall portion is less than a depth of the first recessed groove.

13. The control valve according to claim 1, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

14. The control valve according to claim 2, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

15. The control valve according to claim 3, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

16. The control valve according to claim 4, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

17. The control valve according to claim 5, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

18. The control valve according to claim 6, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

19. The control valve according to claim 7, wherein the elastic pad is made of rubber material, the valve body component is made of aluminum material or made of plastic material by injection molding, the valve core component is made of plastic material by injection molding, the sealing member is made of Teflon, and the elastic pad is fixed to the sealing member by adhesion.

* * * * *